US010316923B2

(12) United States Patent
Tsuji (10) Patent No.: US 10,316,923 B2
(45) Date of Patent: Jun. 11, 2019

(54) DAMPER

(71) Applicant: KYB Corporation, Tokyo (JP)

(72) Inventor: Wataru Tsuji, Tokyo (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 15/565,722

(22) PCT Filed: Jun. 2, 2016

(86) PCT No.: PCT/JP2016/066382
§ 371 (c)(1),
(2) Date: Oct. 11, 2017

(87) PCT Pub. No.: WO2016/199666
PCT Pub. Date: Dec. 15, 2016

(65) Prior Publication Data
US 2018/0080520 A1  Mar. 22, 2018

(30) Foreign Application Priority Data

Jun. 10, 2015  (JP) .................................. 2015-117183

(51) Int. Cl.
*F16F 9/44* (2006.01)
*F16F 9/34* (2006.01)
(Continued)

(52) U.S. Cl.
CPC ................ *F16F 9/44* (2013.01); *F16F 9/103* (2013.01); *F16F 9/348* (2013.01); *B60G 17/08* (2013.01);
(Continued)

(58) Field of Classification Search
CPC .. F16F 9/348; F16F 9/508; F16F 9/103; F16F 9/44; B60G 17/08; B60G 2202/24
See application file for complete search history.

(56) References Cited

U.S. PATENT DOCUMENTS 4,997,068 A * 3/1991 Ashiba ................... F16F 9/468
188/266.4
5,207,300 A * 5/1993 Engel ..................... B60G 17/08
188/266.2
(Continued)

FOREIGN PATENT DOCUMENTS

JP  2004-239285 A   8/2004
JP  2010-261547 A  11/2010
(Continued)

OTHER PUBLICATIONS

Feb. 12, 2019, European Search Report issued for related EP Application No. 16807373.2.

*Primary Examiner* — Thomas J Williams
*Assistant Examiner* — James K Hsiao
(74) *Attorney, Agent, or Firm* — Paratus Law Group, PLLC (57) ABSTRACT

There is provided a damper that can reduce a shock when a piston speed reaches a high speed range from a low speed range without deteriorating a ride comfort while the piston speed is in the low speed range. In order to solve the above-mentioned problem, in a damper D of the present invention, since a orifice (7) and an opening/closing valve (9) are arranged in parallel with a bypass passage (B) bypassing a damping passage (3), and a valve opening pressure of an opening/closing valve (9) is made lower than a valve opening pressure of a damping valve (5), a sudden change in an inclination of a damping force characteristic can be moderated at an inflection point of the damping force characteristic even if the damping force is increased while the piston speed is in the low speed range.

3 Claims, 8 Drawing Sheets

(51) Int. Cl.
*B60G 17/08* (2006.01)
*F16F 9/348* (2006.01)
*F16F 9/10* (2006.01)
(52) U.S. Cl.
CPC .... *B60G 2202/24* (2013.01); *B60G 2500/106* (2013.01)

(56) References Cited

U.S. PATENT DOCUMENTS

| | | | |
|---|---|---|---|
| 5,324,066 A * | 6/1994 | Masamura | B60G 17/0152 188/266.2 |
| 2012/0018264 A1 * | 1/2012 | King | F16F 9/348 188/282.1 |
| 2012/0234639 A1 * | 9/2012 | Teraoka | F16F 9/348 188/280 |
| 2015/0210136 A1 * | 7/2015 | Teraoka | F16F 9/3487 188/282.5 |

FOREIGN PATENT DOCUMENTS

| | | |
|---|---|---|
| JP | 4918022 B | 4/2012 |
| JP | 2014-070643 A | 4/2014 |

* cited by examiner

DAMPER

CROSS REFERENCE TO PRIOR APPLICATION

This application is a National Stage Patent Application of PCT International Patent Application No. PCT/JP2016/066382 (filed on Jun. 2, 2016) under 35 U.S.C. § 371, which claims priority to Japanese Patent Application No. 2015-117183 (filed on Jun. 10, 2015), which are all hereby incorporated by reference in their entirety.

TECHNICAL FIELD

The present invention relates to an improvement of a damper.

BACKGROUND ART

Conventionally, as a damper for a vehicle, for example, as disclosed in JP 2004-239285 A, there has been a damper including: a cylinder; a piston slidably inserted into the cylinder; a piston rod movably inserted into the cylinder and connected to the piston; an extension-side chamber and a compression-side chamber partitioned by the piston in the cylinder; an extension-side port and a compression-side port that are provided in the piston to communicate the extension side chamber with the compression-side chamber; a compression-side leaf valve laminated on the extension-side chamber side of the piston to open and close the compression-side port; an extension-side, leaf valve laminated on the compression-side chamber side of the piston to open and close the extension-side port; and an orifice that communicates the extension-side chamber with the compression-side chamber.

Figure 9:
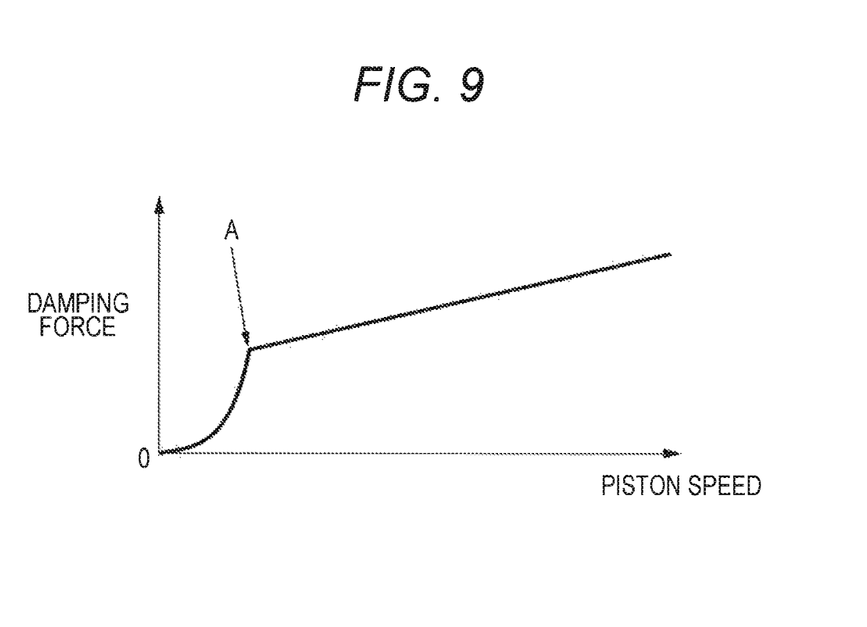
FIG. 9 is a graph showing a damping force characteristic of a conventional damper.

In such a damper, when the piston moves at a low speed with respect to the cylinder, a pressure of the extension-side chamber or the compression-side chamber does not reach a valve opening pressure of the extension-side leaf valve or the compression-side leaf valve, so that hydraulic oil in the cylinder moves between the extension-side chamber and the compression-side chamber via the orifice. Accordingly, as shown in FIG. 9, a characteristic of a damping force (damping force characteristic) of the damper with respect to a piston speed becomes a characteristic peculiar to the orifice, which is proportional to the square of the piston speed when the piston speed is in a low speed range. On the other hand, when the piston speed reaches a high speed range, the extension-side leaf valve or the compression-side leaf valve is opened, and the damping force characteristic of the damper changes to a valve characteristic peculiar to the leaf valve, which is proportional to the piston speed.

SUMMARY OF THE INVENTION

As described above, in the conventional damper, inflection point A appears in a characteristic line at a point where the damping force characteristic changes from the orifice characteristic to the valve characteristic. In particular, when it is desired to quickly raise a damping force with respect to an increase in the piston speed in the low speed range, a channel area of the orifice may be made very small, but this promotes an abrupt change in an inclination in the damping force characteristic at inflection point A. When the piston speed changes across this inflection point, the inclination of the damping force characteristic changes suddenly, causing a vehicle occupant to perceive a shock and to feel that ride comfort is bad. If this is disliked, and the shock is to be relieved by increasing the channel area of the orifice to moderate the inclination of the damping force characteristic up to inflection point A, a damping force shortage is caused in an extremely low speed range, and the ride comfort is deteriorated this time.

The present invention is therefore originated to solve the above-mentioned problems, and it is an object to provide a damper that can reduce a shock when the piston speed reaches the high speed range from the low speed range without deteriorating a ride comfort while the piston speed is in the low speed range.

In order to solve the above-mentioned problems, in a damper of the present invention, an orifice and an opening/closing valve are arranged in parallel with a bypass passage bypassing a damping passage, and a valve opening pressure of the opening/closing valve is made lower than a valve opening pressure of a damping valve.

DESCRIPTION OF EMBODIMENTS

Figure 1:
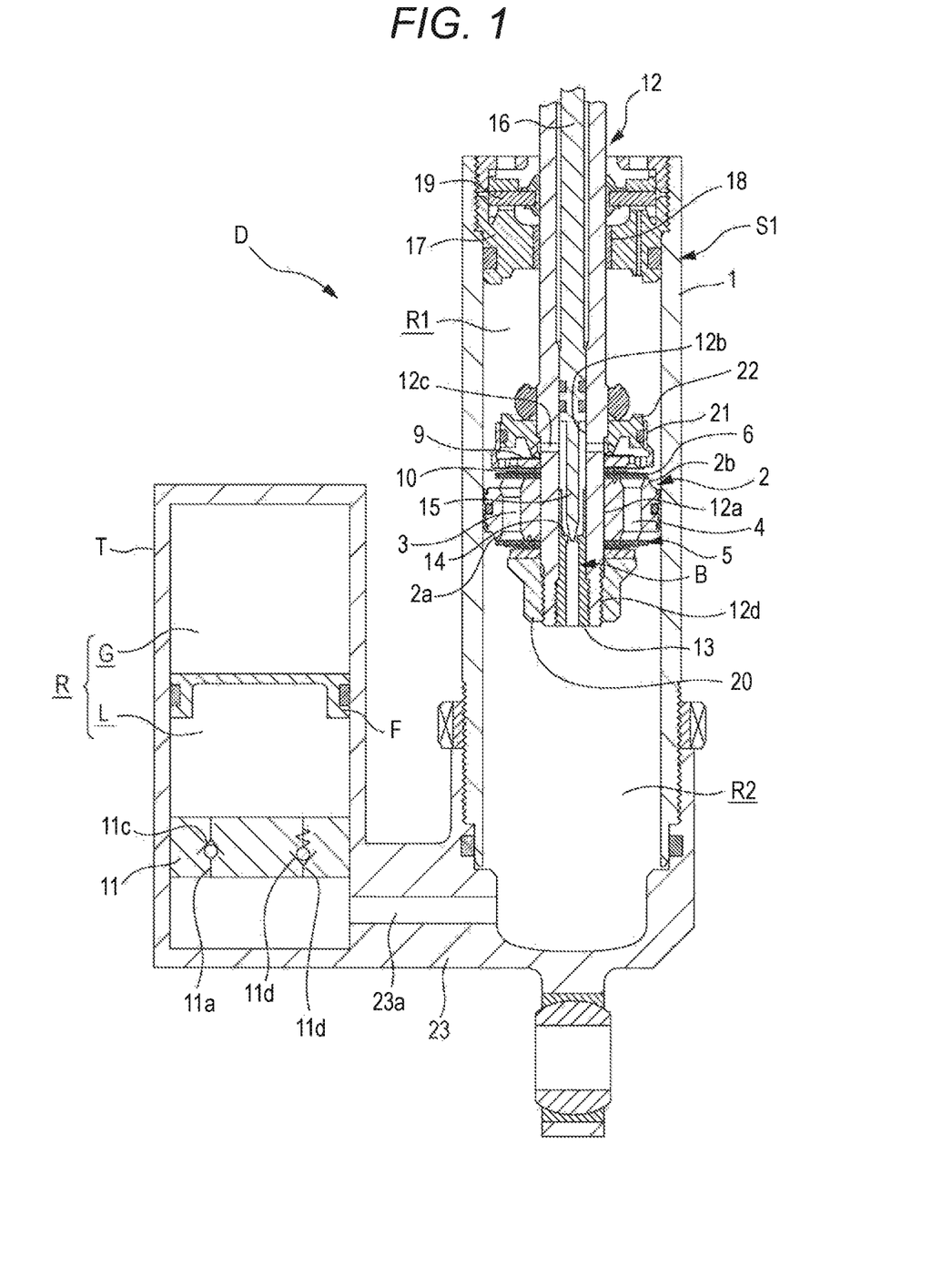
FIG. 1 is a longitudinal sectional view of a damper in one embodiment.
Figure 2:
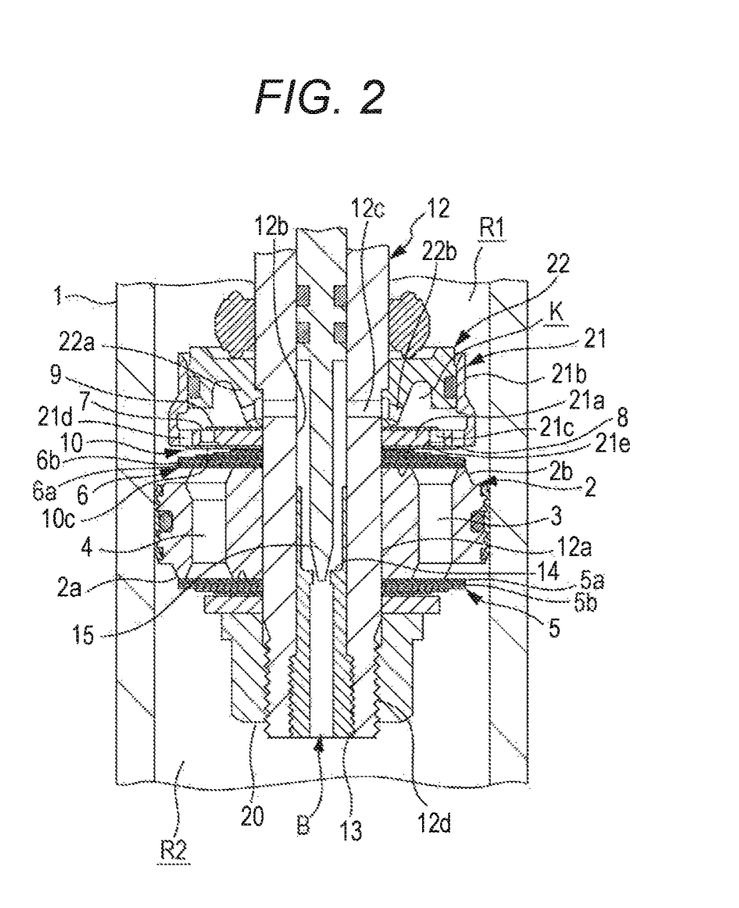
FIG. 2 is an enlarged sectional view of a piston part of a damper in one embodiment.

Hereinafter, the present invention will be described referring to embodiments illustrated in the drawings. As shown in FIGS. 1 and 2, a damper D according to one embodiment is configured to include: a cylinder 1; a piston 2 slidably inserted into the cylinder 1; a damper body S1 having an extension-side chamber R1 as one chamber and a compression-side chamber R2 as another chamber that are partitioned by the piston 2 in the cylinder 1; damping passages 3 and 4 communicating the extension-side chamber R1 with the compression-side chamber R2; a bypass passage B arranged in parallel with the damping passages 3 and 4 and the extension-side chamber R1 and the compression-side chamber R2; leaf valves 5 and 6 as damping valves to open and close the damping passages 3 and 1; and orifices 7 and 8 and the opening/closing valves 9 and 10 that are provided in parallel with the bypass passage B.

This damper body S1 is provided with a reservoir R in a cylindrical tank T provided outside the cylinder 1, and the reservoir is communicated with an inside of the cylinder 1. In a lower part of inside the tank T in the drawing, a valve case 11 is provided to partition the reservoir R and the compression-side chamber R2 in the cylinder 1. Then, the cylinder 1 is filled with liquid such as hydraulic oil, a free piston F is slidably inserted into the reservoir R, and there are formed a liquid chamber L filled with the liquid such as hydraulic oil and a gas chamber G filled with gas, with the free piston F as a boundary. In addition to the hydraulic oil, for example, liquid such as water or an aqueous solution can also be used as the liquid.

Each part will be de scribed in detail below. In the cylinder 1, a piston rod 12 is movably inserted, and a tip end of the piston rod 12 is connected with a piston 2. More specifically, the piston rod 12 has a small-diameter portion 12a provided on a lower end side in FIG. 1, a vertical hole 12b opening from the lower end in FIG. 1 and communicating with an upper end, and a horizontal hole 12c opening from a portion that faces the extension-side chamber R1 as the one chamber, of the small-diameter portion 12a, and communicating with the vertical hole 12b. On an outer periphery of a tip end of the small-diameter portion 12a of the piston rod 12, a screw part 12d is formed. A cylindrical valve seat member 13 is screwed in the vertical hole 12b, and an annular valve seat 14 is formed in the piston rod 12. Furthermore, in the vertical hole 12b, a needle valve element 15 is accommodated so as to be axially movable. The needle valve element 15 is capable of separating and seating on the annular valve seat 14 through an external operation of a control rod 16 that extends from an upper end and is inserted into the vertical hole 12b, and the needle valve element 15 forms a needle valve together with the valve seat member 13. Instead of providing the valve seat member 13, an annular valve seat for a needle valve may be formed on an inner periphery of the piston rod 12.

Further, the upper end side of the piston rod 12 in FIG. 1 protrudes outward through an inside of an annular rod guide 17 mounted on an inner periphery of the upper end of the cylinder 1 in FIG. 1. The rod guide 17 is provided with a cylindrical bush 18 on an inner periphery, and pivotally supports the piston rod 12 inserted into the bush 18 to guide movement of the piston rod 12 in an axial direction, which is a vertical direction in FIG. 1. Further, above the rod guide 17 in FIG. 1, a seal member 19 that seals between the cylinder 1 and the piston rod 12 laminated, so that the inside of the cylinder 1 is kept liquid-tight.

As shown in FIG. 2, the piston 2 having an annular shape is mounted on an outer periphery of the small-diameter portion 12a of the piston rod 12. Specifically, the piston 2 has an extension-side damping passage 3 as one damping passage and a compression-side damping passage 4 as another damping passage that communicate the extension-side chamber with the compression-side chamber R2. At a lower end of the piston 2 in FIG. 2, there is provided an extension-side valve seat 2a provided on an outer periphery of the extension-side damping passage 3, and at an upper end of the piston 2 in FIG. 2, there is provided a compression-side valve seat 2b provided on an outer periphery of the compression-side damping passage 4.

Further, at the lower end of the piston 2 in FIG. 2, the extension-side leaf valve 5 as one damping valve is laminated, and at the upper end of the piston 2 in FIG. 2, the compression-side leaf valve 6 as another damping valve is laminated. The extension-side leaf valve 5 is formed by laminating a plurality of annular plates 5a, assembled to the outer periphery of the small-diameter portion 12a of the piston rod 12 together with the piston 2, and mounted to the small-diameter portion 12a by a piston nut 20 screwed to the screw part 12d. In addition, the extension-side leaf valve 5 is provided with a ring 5b that is thicker than the annular plate 5a and interposed one of between the annular plates 5a, to give initial deflection to the annular plate 5a laminated below this ring 5b in FIG. 1. When fitted to the small-diameter portion 12a of the piston rod 12, the inner periphery of the extension-side leaf valve 5 is fixed, and deflection of the outer periphery is allowed. The extension-side leaf valve 5 is pressed against the extension-side valve seat 2a by a resilient force exerted by itself due to the initial deflection of the annular plate 5a. Accordingly, when the piston 2 moves upward in FIG. 1 with respect to the cylinder 1, the pressure of the extension-side chamber R1, which is compressed and increased, acts on the extension-side leaf valve 5 through the extension-side damping passage 3, and the extension-side leaf valve 5 receives a force for bending the extension-side leaf valve 5 downward in FIG. 2. When the force for bending the extension-side leaf valve 5, which is caused by the pressure of the extension-side chamber R1, exceeds the resilient force caused by the initial deflection, the extension-side leaf valve 5 is bent and separated from the extension-side valve seat 2a, and opens the extension-side damping passage 3 to allow movement of the liquid from the extension-side chamber R1 to the compression-side chamber R2. Therefore, the valve opening pressure when the extension-side leaf valve 5 opens the extension-side damping passage 3 is set according to an amount of the initial deflection and the number of laminated layers of the annular plates. In giving initial deflection to the extension-side leaf valve 5, the initial deflection may be given such that a height of the extension-side valve seat 2a is made higher than a height of an inner periphery of the piston 2 with which the inner periphery of the extension-side leaf valve 5 contacts, so that the extension-side leaf valve 5 is deflected as a whole in a state of being seated on the extension-side valve seat 2a. On the contrary, when the piston 2 moves downward in FIG. 1 with respect to the cylinder 1, the extension-side leaf valve 5 receives the pressure of the compression-side chamber R2, which is compressed and increased, and the extension-side leaf valve 5 is pressed against the extension-side valve seat 2a to close the extension-side damping passage 3 and prevent movement of the liquid from the compression-side chamber R2 to the extension-side chamber R1.

The compression-side leaf valve 6 is formed by laminating a plurality of annular plates 6a, assembled to the outer periphery of the small-diameter portion 12a of the piston rod 12 together with the piston 2, and mounted to the small-diameter portion 12a by the piston nut 20 screwed to the screw part 12d. In addition, the compression-side leaf valve 6 is provided with a ring 6b that is thicker than the annular plate 6a and interposed one of between the annular plates 6a, giving initial deflection to the annular plate 6a laminated above this ring 6b in FIG. 1. When fitted to the small-diameter portion 12a of the piston rod 12, an inner periphery of the compression-side leaf valve 6 is fixed and deflection of the outer periphery is allowed. The compression-side leaf valve 6 is pressed against the compression-side valve seat 2b by a resilient force exerted by itself due to the initial deflection of the annular plate 6a. Accordingly, when the piston 2 moves downward in FIG. 1 with respect to the cylinder 1, the pressure of the compression-side chamber R2, which is compressed and increased, acts on the compression-side leaf valve 6 through the compression-side damping passage 4, and the compression-side leaf valve 6 receives a force for bending the compression-side leaf valve 6 upward in FIG. 2. When the force for bending the compression-side leaf valve 6, which is caused by the pressure of the compression-side chamber R2, exceeds the resilient force caused by the initial deflection, the compression-side leaf valve 6 is bent and separated from the compression-side valve seat 2b, and opens the compression-side damping passage 4 to allow movement of the liquid from the compression-side chamber R2 to the extension-side chamber R1. Therefore, the valve opening pressure when the compression-side leaf valve 6 opens the compression-side damping passage 4 is set according to an amount of the initial deflection and the number of laminated layers of the annular plates. In giving initial deflection to the compression-side leaf valve 6, the initial deflection may be given such that a height of the compression-side valve seat 2b is made higher than a height of the inner periphery of the piston 2 with which the inner periphery of the compression-side leaf valve 6 contacts, so that the compression-side leaf valve 6 is deflected as a whole in a state of being seated on the compression-side valve seat 2b. On the contrary, when the piston 2 moves upward in FIG. 1 with respect to the cylinder 1, the compression-side leaf valve 6 receives the pressure of the extension-side chamber R1, which is compressed and increased, and the compression-side leaf valve 6 is pressed against the compression-side valve seat 2b to close the compression-side damping passage 4 and prevent movement of the liquid from the extension-side chamber R1 to the compression-side chamber R2.

Above the compression-side leaf valve 6 on an outer periphery of the small-diameter portion 12a of the piston rod 12 in FIG. 2, an disk 22 having an annular shape, an extension-side opening/closing valve 9 as one annular opening/closing valve, a plate 21 having an annular shape, and a compression-side opening/closing valve 10 as another annular opening/closing valve are mounted in a laminated state.

Figure 3:
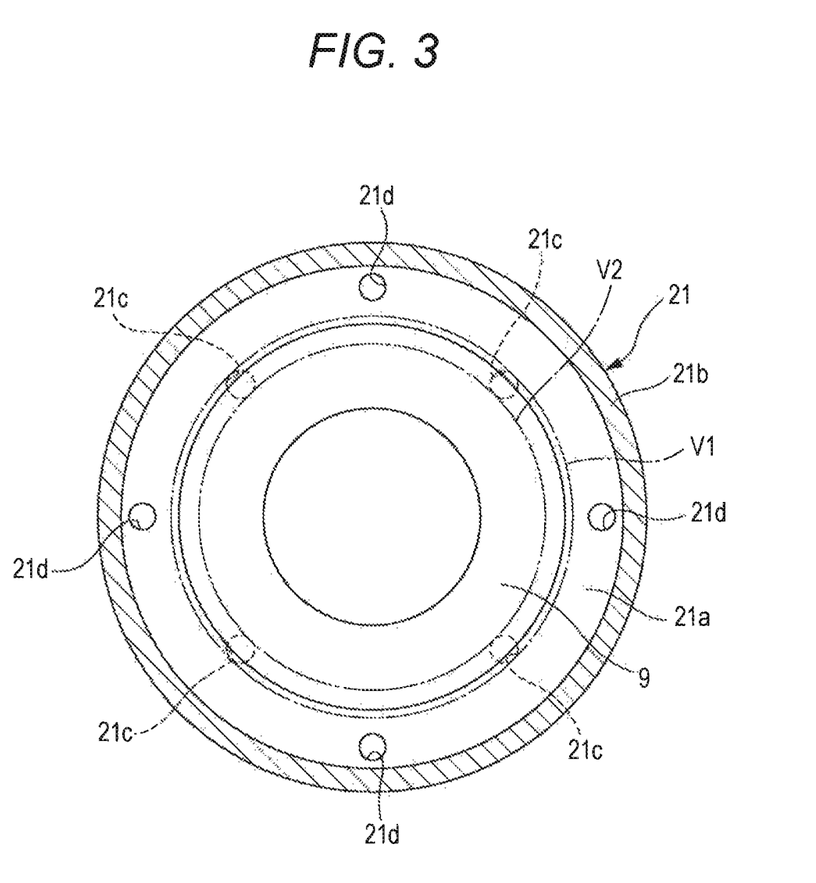
FIG. 3 is a bottom view of a plate and one opening/closing valve.

As shown in FIGS. 2 and 3, the plate 21 has a bottomed cylindrical shape including an annular bottom part 21a and a cylindrical part 21b provided on an outer periphery of the bottom part 21a and directed upward in FIG. 2, and includes: a plurality of extension-side ports 21c as one port provided on a same circumference of the bottom part 21a; a plurality of compression-side ports 21d as another port similarly provided on an outer periphery side from the extension-side port 21c on the same circumference or the bottom part 21a; and an annular groove 21e provided at a lower end of the bottom part 21a in FIG. 2 and communicated with an inlet end of the extension-side port 21c.

The disk 22 is annular, and has a cylindrical part 22a directed downward in FIG. 2 on an inner periphery, and a hole 22b provided in the cylindrical part 22a. The outer diameter of the disk 22 is set to a diameter that can be fitted to an inner periphery of the cylindrical part 21b of the plate 21. The disk 22 is accommodated in the cylindrical part 21b while the cylindrical part 22a is abutted to an inner periphery of the bottom part 21a of the plate 21. In this way, when the disk 22 is accommodated in the plate 21, and both are mounted on the outer periphery of the small-diameter portion 12a, a space K is formed between the plate 21 and the disk 22, and the hole 22b is communicated with the horizontal hole 12c opening on the small-diameter portion 12a. Therefore, the space K is communicated with the compression-side chamber R2 through the hole 22b, the horizontal hole 12c, and the vertical hole 12b, and also communicated with the extension-side chamber R1 through the extension-side port 21c and the compression-side port 21d. Therefore, in this example, by the vertical hole 12b, the horizontal hole 12c, the hole 22b, the space K, the extension-side port 21c, and the compression-side port 21d, there is formed the bypass passage B that bypasses the extension-side damping passage 3 and the compression damping passage 4, and communicates the extension-side chamber R1 and the compression-side chamber R2. Thus, the extension-side port 21c and the compression-side port 21d form a part of the bypass passage B.

The extension-side opening/closing valve 9 is formed by an annular plate and is laminated on the space K side, which is an upper side of the bottom part 21a of the plate 21 in FIG. 2, and the inner periphery is fixed to the small-diameter portion 12a of the piston rod 12 to allow deflection of the outer periphery in an upward direction in FIG. 2. As shown in FIG. 3, the outside diameter of the extension-side opening/closing valve 9 is smaller than virtual circle V1 indicated by a one-dotted chain line passing through the outermost periphery of each the extension-side port 21c, and is larger than virtual circle V2 indicated by a one-dotted chain line passing through the innermost periphery of each the extension-side port 21c. Therefore, even in a state where the extension-side opening/closing valve 9 is laminated on the bottom part 21a of the plate 21 to close the extension-side port 21c, not all of the extension-side ports 21c are closed, and the extension-side port 21c keeps the communication between the extension-side chamber R1 and the space K. When the extension-side opening/closing valve 9 is configured in this way, in a state where the extension-side port 21c is closed, the extension-side opening/closing valve 9 opens a part of the extension-side port 21c, but limits a channel area of the extension-side port 21c, to form an extension-side orifice 7 as one orifice.

The valve opening pressure when the extension-side opening/closing valve 9 is bent to open the extension-side port 21c is set to be lower than the valve opening pressure when the extension-side leaf valve 5 opens the extension-side damping passage 3. When the damper D extends, and the pressure of the extension-side chamber R1 reaches the valve opening pressure, the extension-side opening/closing valve 9 is bent and opened to enable the entire channel area of the extension-side port 21c. On the contrary, when the damper D contracts and receives the pressure of the compression-side chamber R2, the extension-side opening/closing valve 9 is in a state of closing the extension-side port 21c and limits the channel area of the extension-side port 21c to serve as the extension-side orifice 7.

Figure 4:
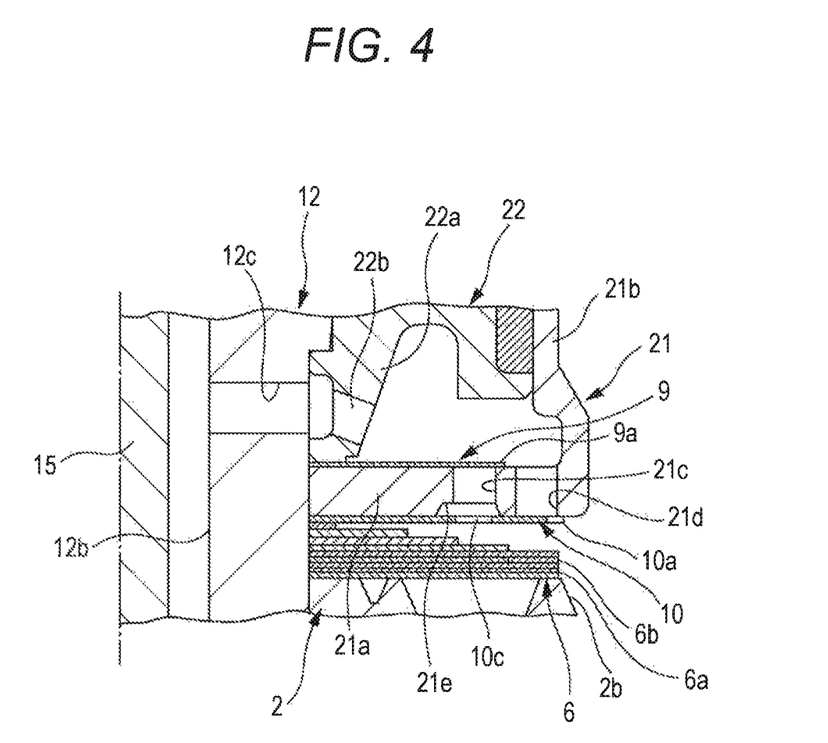
FIG. 4 is an enlarged sectional view of one modified example of a plate and one opening/closing valve.

The extension-side orifice 7 may be formed, in addition to by setting the outside diameter of the extension-side opening/closing valve 9 as described above, by setting the outside diameter of the extension-side opening/closing valve 9 to a diameter that closes the extension-side port 21c but does not close the compression-side port 21d, and providing a cutout 9a communicated with the extension-side port 21c, on the outer periphery, as shown in FIG. 4. Further, as shown in FIG. 5, the extension-side orifice 7 may be formed by setting the outside diameter of the extension-side opening/closing valve 9 to a diameter that closes the extension-side port 21c but does not close the compression-side port 21d, and providing a hole 9b communicated with the extension-side port 21c.

Figure 6:
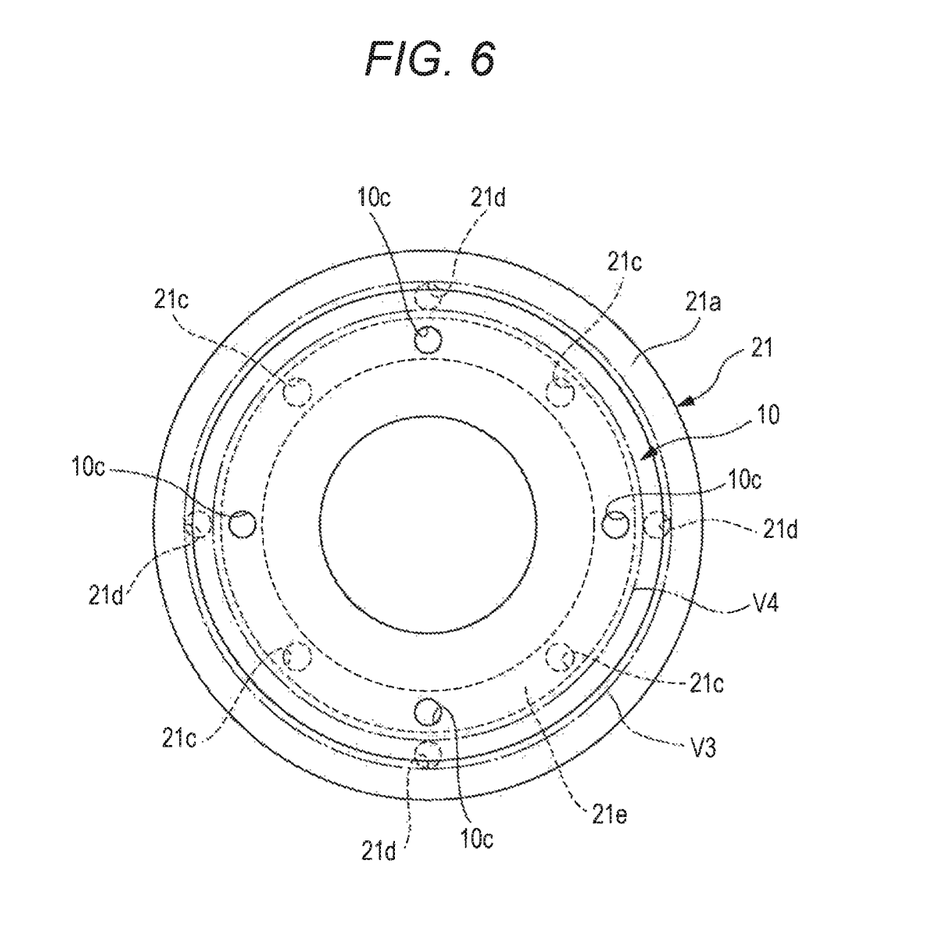
FIG. 6 is a plan view of a plate and another opening/closing valve.

The compression-side opening/closing valve 10 is formed by an annular plate and is laminated on the extension-side chamber R1 side, which is a lower side of the bottom part 21a of the plate 21 in FIG. 2, and the inner periphery is fixed to the small-diameter portion 12a of the piston rod 12 to allow deflection of the outer periphery in a downward direction in FIG. 2. As shown in FIG. 6, the outside diameter of the compression-side opening/closing valve 10 is smaller than virtual circle V3 indicated by a one-dotted chain line passing through the outermost periphery of each the compression-side ports 21d, and is larger than virtual circle V4 indicated by a one-dotted chain line passing through the innermost periphery of each the compression-side port 21d. Therefore, even in a state where the compression-side opening/closing valve 10 is laminated on the bottom part 21a of the plate 21 to close the compression-side port 21d, not all of the compression-side ports 21d are closed, and the compression-side port 21d keeps the communication between the extension-side chamber R1 and the space K. When the compression-side opening/closing valve 10 is configured in this way, in a state where the compression-side port 21d is closed, the compression-side opening/closing valve 10 opens a part of the compression-side port 21d, but limits a channel area of the compression-side port 21d, to form a compression-side orifice 8 as another orifice.

The valve opening pressure when the compression-side opening/closing valve 10 is bent to open the compression-side port 21d is set to be lower than the valve opening pressure when the compression-side leaf valve 6 opens the compression-side damping passage 4. When the damper D contracts, and the pressure of the compression-side chamber R2 reaches the valve opening pressure, the compression-side opening/closing valve 10 is bent and opened to enable the entire channel area of the compression-side port 21d. On the contrary, when the damper extends and receives the pressure of the extension-side chamber R1, the compression-side opening/closing valve 10 is in a state of closing the compression-side port 21d and limits the channel area of the compression-side port 21d to serve as the compression-side orifice 8.

Figure 5:
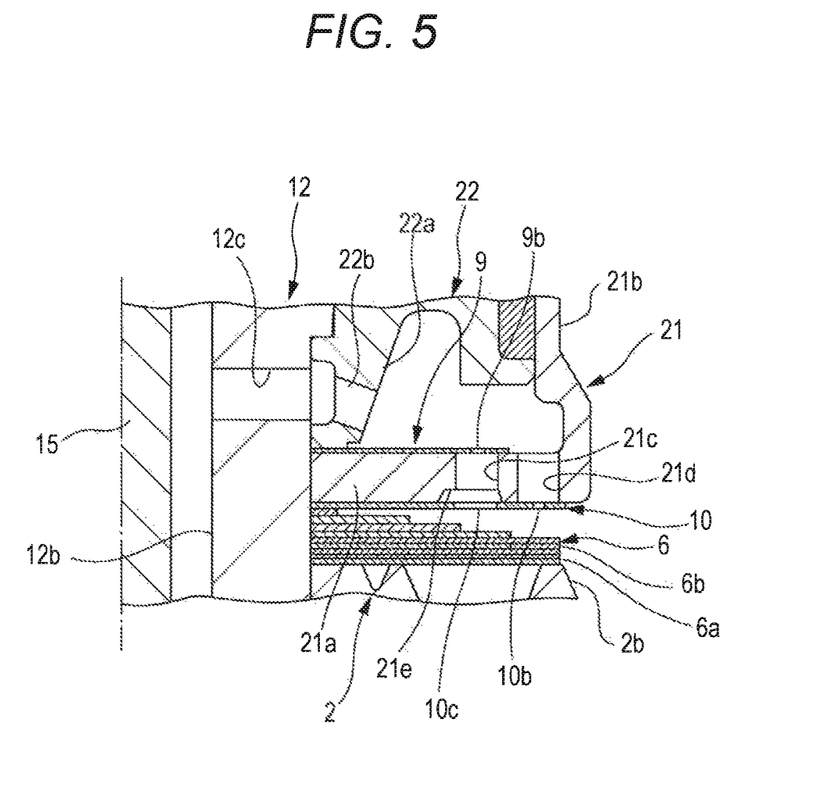
FIG. 5 is an enlarged sectional view of another modified example of a plate and one opening/closing valve.

The compression-side orifice 8 may be formed, in addition to by setting the outside diameter of the compression-side opening/closing valve 10 as described above, by setting the outside diameter of the compression-side opening/closing valve 10 to a diameter that closes the compression-side port 21d, and providing a cutout 10a communicated with the compression-side port 21d, on the outer periphery as shown in FIG. 4, or providing a hole 10b communicated with the compression-side port 21d as shown in FIG. 5.

The compression-side opening/closing valve 10 is provided with a through hole 10c opposed to the annular groove 21e, in a state that compression-side opening/closing valve 10 is laminated on the bottom part 21a of the plate 21, so as not to close the extension-side port 21c. Since the annular groove 21e is provided, communication of the extension-side port 21c is secured even if the through hole 10c does not face the extension-side port 21c. Accordingly, the compression-side opening/closing valve 10 can be laminated without requiring positioning in the circumferential direction with respect to the plate 21, and easily assembled to the piston rod 12.

Figure 7:
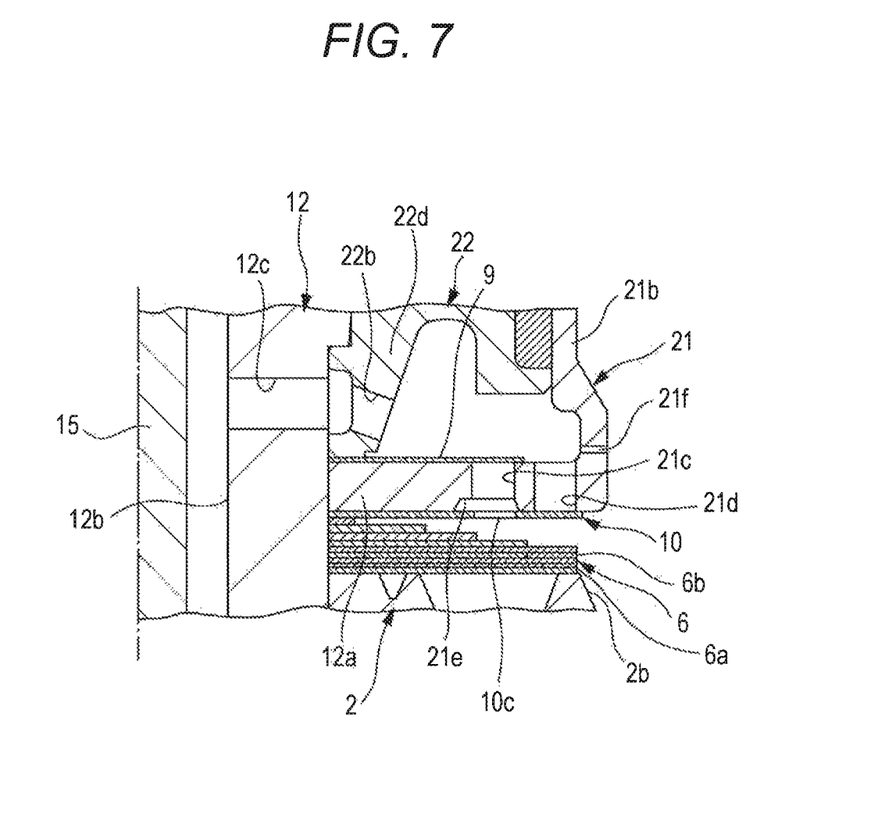
FIG. 7 is an enlarged sectional view of one modified example of a plate and one and another opening/closing valves.

Further, as shown in FIG. 7, an orifice 21f may be provided to the plate 21 in addition to the extension-side port 21c and the compression-side port 21d, to entirely open and close the extension-side port 21c and the compression-side port 21d with the respectively corresponding extension-side opening/closing valve 9 and compression-side opening/closing valve 10.

Subsequently, the tank T has a cylindrical shape with its upper end and lower end closed, and the lower end in FIG. 1 is connected to the lower end of the cylinder 1 via a connection part 23. The inside of the tank T is communicated with the compression-side chamber R2 of the cylinder 1 via a passage 23a provided in the connection part 23. In the tank T, the valve case 11 is provided, and the reservoir R is partitioned above the valve case 11 in FIG. 1. The free piston F is slidably accommodated in the tank T, and an inside of the reservoir R is partitioned into the liquid chamber L and the gas chamber G. The valve case 11 partitions the compression-side chamber R2 in the cylinder 1 and the liquid chamber L of the reservoir R, and has a suction passage 11a and a discharge passage 11b that communicate the compression-side chamber R2 with the liquid chamber L. In the suction passage 11a, there is provided a check valve 11c that allows a liquid flow only from the liquid chamber L to the compression-side chamber R2. In the discharge passage 11b, there is provided a discharge-side damping valve 11d that allows a liquid flow only from the compression-side chamber R2 toward the liquid chamber L, and applies resistance toward the liquid flow.

The damper D is configured as described above, and its operation will be described below. First, an operation of the damper D during an extension operation in which the piston 2 moves upward in FIG. 1 with respect to the cylinder 1 will be described. During the extension operation of the damper D, the piston 2 compresses the extension-side chamber R1, so that the liquid tries to move from the extension-side chamber R1 to the compression-side chamber R2. Further, since the piston rod 12 is retracted from inside the cylinder 1, the liquid for the exited piston rod 12 is short in the cylinder 1. When the piston speed, which is a moving speed of the piston 2 with respect to the cylinder 1, is in the low speed range, the pressure of the extension-side chamber R1 does not reach the valve opening pressure of the extension-side leaf valve 5, so that the liquid passes through the extension-side orifice 7 and the compression-side orifice 8, to move from the extension-side chamber R1 to the compression-side chamber R2 via the bypass passage B. On the other hand, the shortfall of the liquid in the cylinder 1 is supplied from the liquid chamber L of the reservoir R to the compression-side chamber R2 through the suction passage 11a. Accordingly, since the pressure in the compression-side chamber R2 becomes substantially the reservoir pressure as the pressure in the extension-side chamber R1 rises, a differential pressure is generated in both chambers, and the damper D exerts a damping force for suppressing the extension operation. When the piston speed is even extremely low in the low speed range, the liquid passes through the extension-side orifice 7 and the compression-side orifice 8 until the extension-side opening/closing valve 9 opens the extension-side port 21c. Accordingly, a damping force characteristic of the damper D becomes an orifice specific characteristic in which the inclination increases in proportion to the square of the piston speed as the piston speed increases, as indicated by line X1 in FIG. 8. When the piston speed even exceeds the extremely low side in the low speed range, the pressure in the extension-side chamber R1 reaches the valve opening pressure of the extension-side opening/closing valve 9 to open the valve, the extension-side port 21c is opened, and the liquid passes through the extension-side port 21c in which the entire area becomes effective. Accordingly, the damping force characteristic of the damper D becomes a valve specific characteristic that is proportional to the increase in the piston speed, as indicated by line Y1 in FIG. 8, in which the inclination is smaller than that of line X1. Further, when the piston speed reaches a high speed range, the pressure in the extension-side chamber R1 reaches the valve opening pressure of the extension-side leaf valve 5 to open the valve, and the extension-side damping passage 3 is opened, through which the liquid passes. Since not only the bypass passage B but also the extension-side damping passage 3 permits the passage of the liquid, the damping force characteristic of the damper D becomes the valve specific characteristic that is proportional to the increase in the piston speed as shown by line Z1 in FIG. 8 in which the inclination is further reduced as compared with line Y1.

Figure 8:
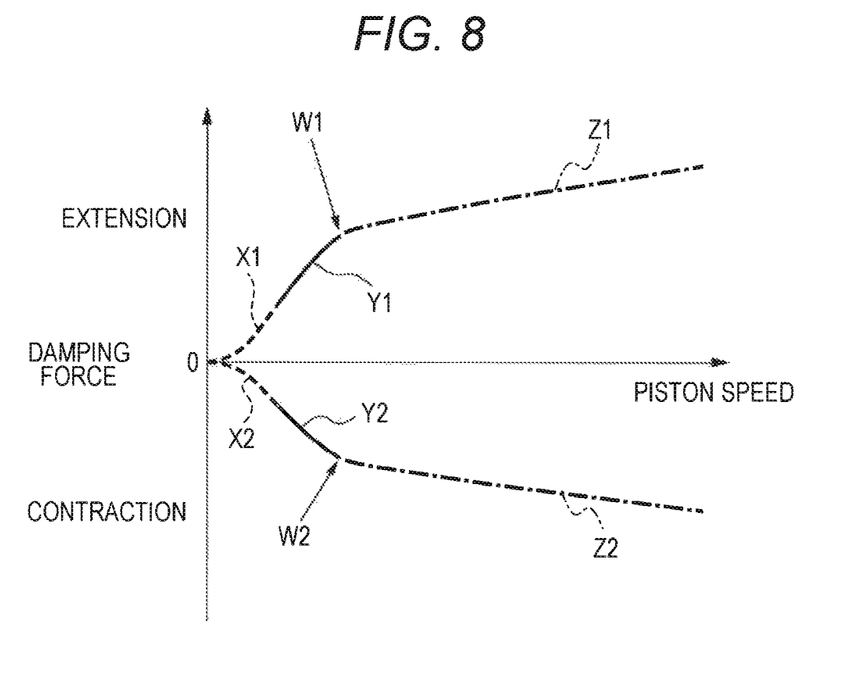
FIG. 8 is a graph showing a damping force characteristic of a damper in one embodiment.

As described above, in the damper D of the present invention, since the extension-side port 21c is opened by the extension-side opening/closing valve 9 before the extension-side damping passage 3 is opened and the damping force characteristic shifts to the valve characteristic from the orifice characteristic, the inclination of the damping force characteristic is once reduced before the shift to the valve characteristic indicated by line Z1. Therefore, in the damper D of the present invention, even if the piston speed changes from the low speed range to the high speed range, the extension-side leaf valve 8 as the one damping valve is opened, and the damping force characteristic shifts to the valve characteristic in which the liquid can pass through the extension-side damping passage 3 as the one damping passage, a sudden inclination change of the damping force characteristic at inflection point W1 is moderated.

Since the sudden inclination change at inflection point W1 is moderated, a channel area of the extension-side orifice 7 as one orifice can be set to be small to increase the inclination in the damping force characteristic peculiar to the orifice, also eliminating the damping force shortage of the damper D when the piston speed is in the low speed range. As described above, according to the damper D of the present invention, during the extension operation, it is possible to reduce a shock when the piston speed reaches the high speed range from the low speed range without deteriorating the ride comfort while the piston speed is in the low speed range.

On the other hand, an operation of the damper D during a contraction operation in which the piston 2 moves downward in FIG. 1 with respect to the cylinder will be described. During the contraction operation of the damper D, the piston 2 compresses the compression-side chamber R2, so that the liquid tries to move from the compression-side chamber R2 to the extension-side chamber. Further, since the piston rod 12 enters inside the cylinder 1, the liquid for the entered piston rod 12 becomes excessive in the cylinder 1. When the piston speed, which is the moving speed of the piston 2 with respect to the cylinder 1, is in the low speed range, the pressure of the compression-side chamber R2 does not reach the valve opening pressure of the compression-side leaf valve 6, so that the liquid passes through the compression-side orifice 8 and the extension-side orifice 7, to move from the compression-side chamber R2 to the extension-side chamber R1 via the bypass passage B. The excess liquid in the cylinder 1 is discharged from the compression-side chamber R2 to the liquid chamber L of the reservoir R through the discharge passage 11b. Accordingly, as the pressure in the compression-side chamber R2 rises, the extension-side chamber R1 is depressurized, a differential pressure is generated in both chambers, and the damper D exerts the damping force for suppressing the contraction operation. When the piston speed is even extremely low in the low speed range, the liquid flowing from the compression-side chamber R2 toward the extension-side chamber R1 passes through the compression-side orifice 8 and the extension-side orifice 7 until the compression-side opening/closing valve 10 opens the compression-side port 21d. Accordingly, the damping force characteristic of the damper D becomes an orifice specific characteristic in which the inclination increases in proportion to the square of the piston speed as the piston speed increases, as indicated by line X2 in FIG. 8. When the piston speed even exceeds the extremely low side in the low speed range, the pressure in the compression-side chamber R2 reaches the valve opening pressure of the compression-side opening/closing valve 10 to open the valve, the compression-side port 21d is opened, and the liquid passes through the compression-side port 21d in which the entire area becomes effective. Accordingly, the damping force characteristic of the damper D becomes the valve specific characteristic that is proportional to the increase in the piston speed, as indicated by line Y2 in FIG. 8, in which the inclination is smaller than that of line X2. Further, when the piston speed reaches the high speed range, the pressure in the compression-side chamber R2 reaches the valve opening pressure of the compression-side leaf valve 6 to open the valve, and the compression-side damping passage 4 is opened, through which the liquid passes. Since not only the bypass passage B but also the compression-side damping passage 4 permits the passage of the liquid, the damping force characteristic of the damper becomes the valve specific characteristic that is proportional to the increase in the piston speed as shown by line Z2 in FIG. 8, in which the inclination is further reduced as compared with line Y2.

As described above, in the damper D of the present invention, since the compression-side port 21d is opened by the compression-side opening/closing valve 10 before the compression-side damping passage 4 is opened and the damping force characteristic shifts to the valve characteristic from the orifice characteristic, the inclination of the damping force characteristic is once reduced before the shift to the valve characteristic indicated by line Z2. Accordingly, in the damper D of the present invention, even if the piston speed changes from the low speed range to the high speed range, the compression-side leaf valve 6 as the another damping valve is opened, and the damping force characteristic shifts to the valve characteristic in which the liquid can pass through the compression-side damping passage 4 as the another damping passage, a sudden inclination change of the damping force characteristic at inflection point W2 is moderated.

Since the sudden inclination change at inflection point W2 is moderated, a channel area of the compression-side orifice 6 as another orifice can be set to be small to increase the inclination in the damping force characteristic peculiar to the orifice, also eliminating the damping force shortage of the damper D when the piston speed is in the low speed range. As described above, according to the damper D of the present invention, during the contraction operation, it is possible to reduce a shock when the piston speed reaches the high speed range from the low speed range without deteriorating the ride comfort while the piston speed is in the low speed range.

In other words, in the damper D, since the orifice 7 (8) and the opening/closing valve 9 (10) are arranged in parallel with the bypass passage B bypassing the damping passage 3 (4), and the valve opening pressure of the opening/closing valve 9 (10) is made lower than the valve opening pressure of the damping valve 5 (6), a sudden change in the inclination of the damping force characteristic at the inflection point of the damping force characteristic can be moderated even if the damping force is increased while the piston speed is in the low speed range. Therefore, according to the damper D of the present invention, it is possible to reduce a shock when the piston speed reaches the high speed range from the low speed range without deteriorating the ride comfort while the piston speed is in the low speed range.

Further, in the damper D of this embodiment, there are provided the orifices 7 and 8 in the bypass passage B bypassing the damping passages 3 and 4; one opening/closing valve 9 arranged in parallel with one orifice 7 and configured to be opened by the pressure of the one chamber (extension-side chamber) R1; and another opening/closing valve 10 arranged in parallel with another orifice 8 and configured to be opened by the pressure of another chamber (compression-side chamber) R2, and since the valve opening pressure of one opening/closing valve 9 is made lower than the valve opening pressure of the one damping valve 5 while the valve opening pressure of another opening/closing valve 10 is made lower than the valve opening pressure of the another damping valve 6, it is possible to moderate a sudden inclination change of the damping force characteristic at the inflection point of the damping force characteristic, even if the damping force is increased while the piston speed is in the low speed range in both the extension and contraction operations of the damper D. Therefore, according to the damper D of the present invention, it is possible to reduce a shock when the piston speed reaches the high speed range from the low speed range without deteriorating the ride comfort while the piston speed is in the low speed range during both the extension and contraction operations. In addition, since the valve opening pressures of the one opening/closing valve 9 and the other opening/closing valve 10 can be separately set, the damping force characteristics during the extension operation and the contraction operation of the damper D can be separately set.

Further, if there is provided the plate 21 having a port 21c (21d) forming a part of the bypass passage B, and the plate 21 is provided with the plate-like opening/closing valve 9 (10) that opens and closes the port 21c (21d), and the opening closing valve 9 (10) is provided with the orifice 7 (8), it is advantageous that the above effect can be obtained while making the structure of the damper D very simple.

Further, if there is provided the plate 21 having a port 21c (21d) forming a part of the bypass passage B, and the plate 21 is provided with the plate-like opening/closing valve 9 (10) that opens and closes the port 21c (21d), and a part of the port 21c (21d) is opened to form the orifice 7 (8) when the port 21c (21d) is closed by the opening/closing valve 9 (10), it is possible to form the orifice 7 (8) without providing the cutout 9a or the hole 9b to the opening/closing valve 9 (10), and the structure of the damper D becomes simpler and the manufacturing cost can be reduced.

Further if there is provided the plate 21 having a port 21c (21d) forming a part of the bypass passage B, and the plate 21 is provided with the plate-like opening/closing valve 9 (10) that opens and closes the port 21c (21d), and a part of the port 21c (21d) is opened to form the orifice 7 (8) when the port 21c (21d) is closed by the opening/closing valve 9 (10), it is possible to form the orifice 7 (8) without providing the cutout 9a or the hole 9b to the opening/closing valve 9 (10), and the structure of the damper D becomes simpler and the manufacturing cost can be reduced.

Further, it is also possible to provide the plate 21 having a port 21c (21d) forming a part of the bypass passage B, and the plate-like opening/closing valve 9 (10) that opens and closes the port 21c (21d) to the plate 21, and provide an orifice 21f arranged in parallel with the port 21c (21d) to the plate 21. Even in this case, while the structure of the damper D can be made very simple, its is possible to enjoy the advantage that the above effect can be obtained.

Further, in the damper D of this embodiment, there is provided the one opening/closing valve 9 that opens and closes one port 21c forming a part of the bypass passage B, there is provided the another opening/closing valve 10 that opens and closes another port 21d forming a part of the bypass passage B, the one opening/closing valves 9 opens a part of the one port 21c to form the one orifice 7 while closing the one port 21c, and the another opening/closing valves 10 opens a part of the another port 21d to form the another orifice 8 while closing the another port 21d. Therefore, according to the damper D in this embodiment, while the structure of the damper D is made very simple, it is possible to realize improvement of the ride comfort while the piston speed is in the low speed range, and reduction of a shock in reaching the high speed range from the low speed range in both the extension operation and the contraction operation. Also, since the valve opening pressures of the one opening/closing valve 9 and the another opening/closing valve 10 can be separately set, and the channel areas of the one port 21c and the another port 21d can be separately set, the damping force characteristics during the extension operation and the contraction operation of the damper D can be set separately.

In this embodiment, the needle valve is provided, the resistance applied to the flow of the passing liquid in the bypass passage B can be changed, and the bypass passage B can be shut off. Thus, providing a valve that enables opening and closing of the bypass passage B and a change in resistance also allows external adjustment of the damping force characteristic of the damper D.

Although the damper D is provided with the tank T separately from the cylinder 1 to form the reservoir R in the above description, it is also possible to eliminate the tank T and provide an outer cylinder that covers the outer periphery of the cylinder 1, to form the reservoir R between the cylinder 1 and the outer cylinder. Further, instead of providing the reservoir B, it is also possible to eliminate the tank T and provide a free piston below the compression-side chamber R2 of the cylinder 1 to form a gas chamber in the cylinder 1, to configure the damper D as a so-called single cylinder type damper.

Furthermore, although the one orifice 7 and the one opening/closing valve 9 are arranged in parallel with the bypass passage B, and the another orifice 8 and the another opening/closing valve 10 are arranged in parallel with the bypass passage B in this embodiment, it is also possible to provide only the one orifice 7 and the one opening/closing valve 9, or provide only the another orifice 8 and the another opening/closing valve 10. Alternatively, only the one orifice 7 on the extension-side may be provided, or only the another orifice 8 on the compression-side may be provided.

In the case of this embodiment, when only the one orifice 7 and the one opening/closing valve 9 are arranged in parallel with the bypass passage B, it is possible to reduce a shock when the piston speed reaches the high speed range from the low speed range without deteriorating the ride comfort while the piston speed is in the low speed range during the extension operation of the damper D. Further, in the case of this embodiment, when only the another orifice 8 and the another opening/closing valve 10 are arranged in parallel with the bypass passage B, it is possible to reduce a shock when the piston speed reaches the high speed range from the low speed range without deteriorating the ride comfort while the piston speed is in the low speed range during the contraction operation of the damper D. Accordingly, although the one chamber is the extension-side chamber R1 and the another chamber is the compression-side chamber R2 in this embodiment, the one chamber may be the compression-side chamber R2 and the another chamber may be the extension-side chamber R1.

Further, as described above, when the piston 2 moves with respect to the cylinder 1, the liquid moves between the compression-side chamber R2 and the reservoir R. Therefore, it is also possible that either one of the compression-side chamber R2 and the reservoir R is used as the one chamber, either one of the compression-side chamber R2 and the reservoir R is used as the other chamber, the compression-side chamber R2 and the reservoir R are communicated with each other by the bypass passage, and an orifice and an opening/closing valve are provided. Thus, although the damping passages 3 and 4 are provided to the piston 2 in the damper D of this embodiment, the damping passage can be provided at any position depending on which chamber is used as the one chamber and the another chamber. That is, the damping passage may be provided to the piston 2 or the valve case 11, or may be provided to other than these, as long as the one chamber and the another chamber are communicated with each other. Further, with regard to the bypass passage B, as long as the one chamber and the another chamber are communicated with each other, the installation location is not limited to the illustrated embodiment. As for the damping valve, a valve other than the leaf valve may be used as long as a valve opening pressure can be set for the valve.

This application claims priority based on Japanese Patent Application No. 2015-117183 filed on Jun. 10, 2015, the contents of which is incorporated herein by reference in its entirety.

The invention claimed is:

1. A damper comprising:
    a damper body having a cylinder, a piston slidably inserted into the cylinder, and a first chamber and a second chamber between which liquid moves with movement of the piston with respect to the cylinder;
    at least one damping passage that communicates the first chamber with the second chamber;
    a bypass passage that is arranged in parallel with the at least one damping passage and communicates the first chamber with the second chamber;
    at least one damping valve that opens and closes the at least one damping passage;
    a plate having a port forming a part of the bypass passage;
    at least one opening/closing valve that is provided with the plate, has an annular shape, and opens and closes the port; and
    at least one orifice formed by opening a part of the port on the outer peripheral side of the at least one opening/closing valve when the port is closed,
    wherein the at least one orifice and the at least one opening/closing valve are provided in parallel with the bypass passage, and
    wherein a valve opening pressure of the at least one opening/closing valve is lower than a valve opening pressure of the at least one damping valve.

2. The damper according to claim 1, wherein
    the at least one damping passage comprises a first damping passage and a second damping passage,
    the at least one damping valve comprises a first damping valve that opens and closes the first damping passage, and a second damping valve that opens and closes the second damping passage,
    the at least one orifice comprises a first orifice and a second orifice provided to the bypass passage,
    the at least one opening/closing valve comprises a first opening/closing valve provided in parallel with the first orifice, and a second opening/closing valve provided in parallel with the second orifice,
    a valve opening pressure of the first opening/closing valve is lower than a valve opening pressure of the first damping valve, and
    a valve opening pressure of the second opening/closing valve is lower than a valve opening pressure of the second damping valve.

3. The damper according to claim 2,
    wherein the port comprises a first port provided with the plate and forming a part of the bypass passage and a second port provided with the plate and forming a part of the bypass passage,
    wherein the first opening/closing valve that has an annular shape, is laminated on one end side of the plate, and opens and closes the first port,
    wherein the second opening/closing valve that has an annular shape, is laminated on another end side of the plate, and opens and closes the second port,
    wherein a part of the first port is opened to form the first orifice on the outer peripheral side of the first opening/closing valve when the first port is closed by the first opening/closing valve, and
    wherein a part of the second port is opened to form the second orifice on the outer peripheral side of the second opening/closing valve when the second port is closed by the second opening/closing valve.

* * * * *